Dec. 2, 1952    Q. A. KERNS ET AL    2,620,256
ANALYZER
Filed Oct. 2, 1951    4 Sheets-Sheet 1

INVENTORS.
QUENTIN A. KERNS
LU W. WHITCOMB
EUGENE E. BROWN
BY
Roland A. Anderson
ATTORNEY.

Dec. 2, 1952　　　Q. A. KERNS ET AL　　　2,620,256
ANALYZER
Filed Oct. 2, 1951　　　　　　　　　　　4 Sheets-Sheet 2
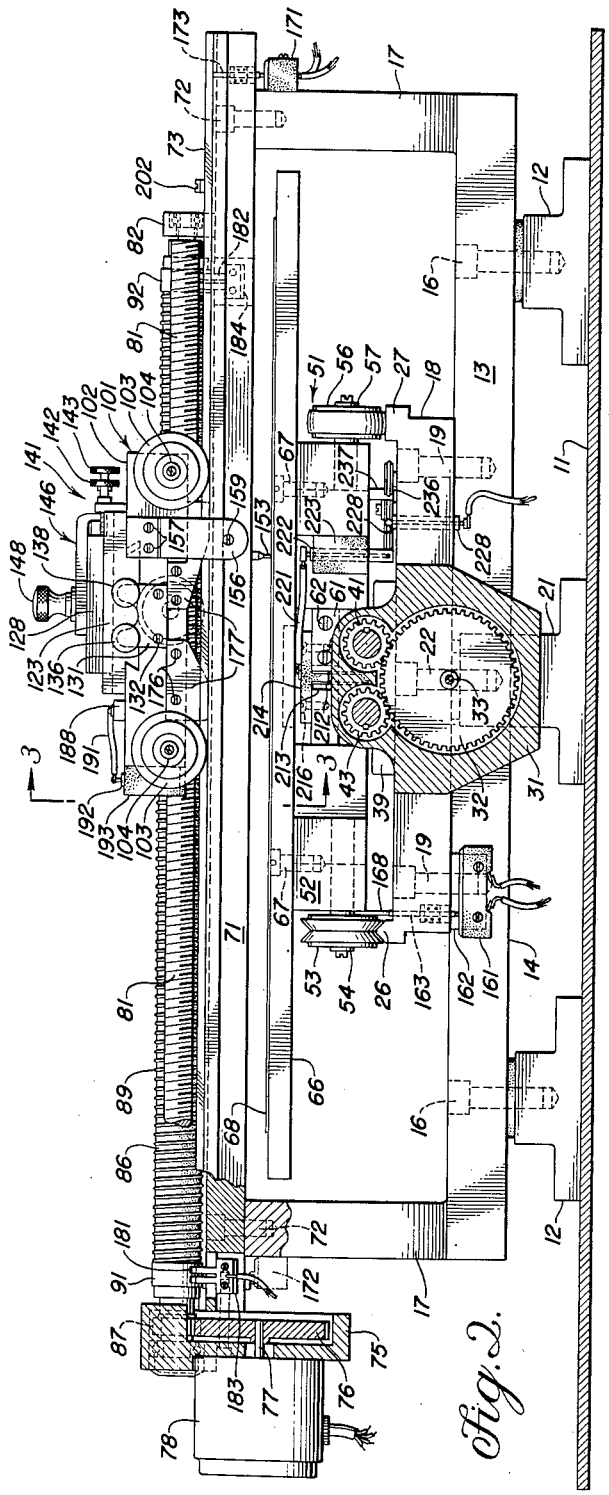
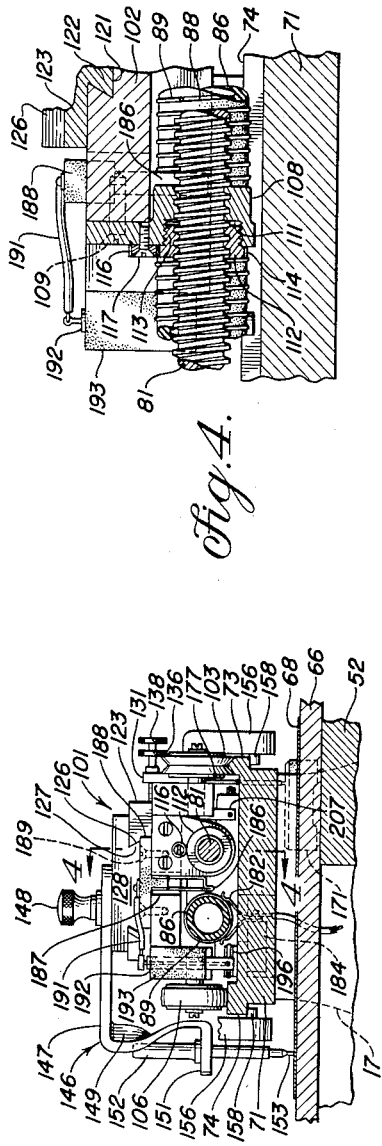
INVENTORS.
QUENTIN A. KERNS
LU W. WHITCOMB
EUGENE E. BROWN
BY
Roland A. Anderson
ATTORNEY.

Dec. 2, 1952

Q. A. KERNS ET AL 2,620,256

ANALYZER

Filed Oct. 2, 1951

INVENTORS.
QUENTIN A. KERNS
LU W WHITCOMB
EUGENE E. BROWN

BY

Roland A Anderson

ATTORNEY.

Dec. 2, 1952  Q. A. KERNS ET AL  2,620,256
ANALYZER
Filed Oct. 2, 1951  4 Sheets-Sheet 4
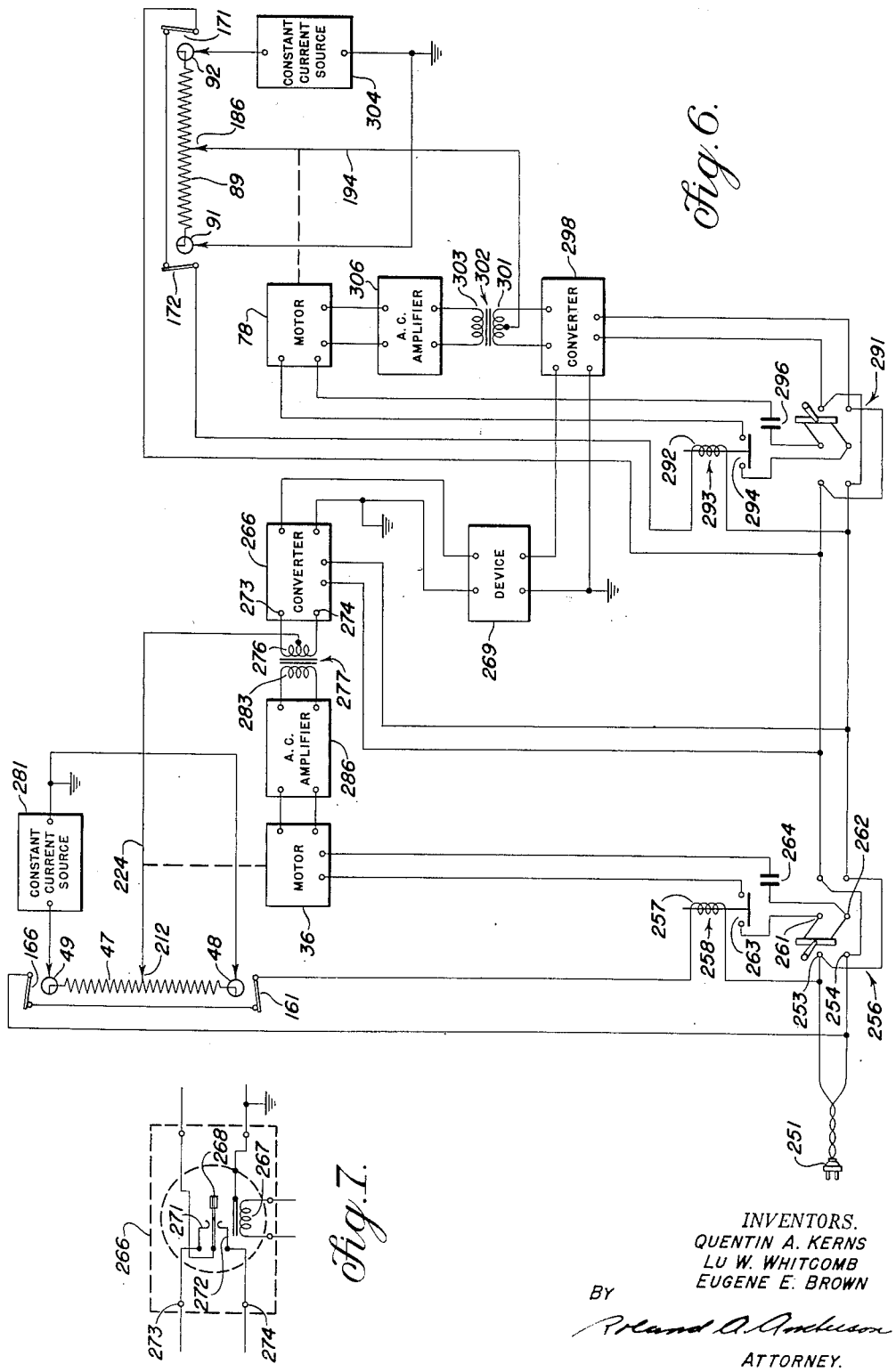
INVENTORS.
QUENTIN A. KERNS
LU W. WHITCOMB
EUGENE E. BROWN
BY
Roland A. Anderson
ATTORNEY.

Patented Dec. 2, 1952

2,620,256

UNITED STATES PATENT OFFICE 2,620,256

ANALYZER

Quentin A. Kerns, Oakland, and Lu W. Whitcomb and Eugene E. Brown, Berkeley, Calif., assignors to the United States of America as represented by the United States Atomic Energy Commission Application October 2, 1951, Serial No. 249,372

2 Claims. (Cl. 346—32)

This invention relates to an analyzer and more particularly to an apparatus for simultaneously plotting two variable quantities.

A majority of the recorders known are dependent upon a time base and utilize a chart which is moved at a uniform rate while a scribing instrument is caused to travel across the chart in a manner proportional to the quantity being recorded. Such devices are clearly inadequate where it is desired to determine the relation between two variable quantities neither of which is time, by plotting one against the other. To make such determinations it has been necessary to obtain a plot of each with respect to time and then to manually translate the two plots into a single plot giving the desired relation.

To produce a continuous plot of the relation between two variables a table bearing suitable graph paper is moved in a direction parallel to one set of lines of such graph paper in a manner proportional to one variable and a scribing instrument, which is in contact with the graph paper, is moved transversely to the direction of the paper in a manner proportional to the other variable. Separate motors are provided to drive the table and the scribing instrument, each of which is controlled in response to the variable quantity which is applied as a proportional voltage to a converter unit to drive the respective motor.

It is therefore an object of the present invention to provide a new and improved analyzing and recording apparatus.

Another object of the present invention is to provide an analyzer for continuously and simultaneously recording the relation between two variable quantities.

Still another object of the invention is to provide an analyzer having a table moving longitudinally at a rate proportional to one variable and a stylus moving transversely, to the movement of the table, at a rate porportional to a second variable.

A further object of the present invention is to provide an apparatus having two movable elements disposed transversely with respect to each other, one being controlled by a phase sensitive motor responsive to one variable quantity, and the other being controlled by a phase sensitive motor responsive to a second variable quantity.

A still further object of the present invention is to provide a table movable in one direction and a stylus movable transversely thereto with an electric circuit developing a voltage proportional to the position of the table and another voltage proportional to the position of the stylus which voltages are separately and respectively compared with voltages proportional to two separate variables to control the respective movement of the table and the stylus.

Another object of the present invention is to provide a simple and rugged apparatus for directly recording the relationship between two independent variables.

Other objects and advantages will be apparent from the following description and claims considered together with the accompanying drawing, in which:

Figure 2 is an end elevation, partly in section, taken along the line 2—2 of Fig. 1;

Figure 3 is a sectional view taken along the line 3—3 of Fig. 2;

Figure 4 is a sectional view taken along the line 4—4 of Fig. 3;

Figure 6 is a schematic wiring diagram of the electrical circuit of the invention as illustrated in Fig. 1; and Figure 7 is a schematic diagram of one of the converters shown in Fig. 6.

Figure 1:
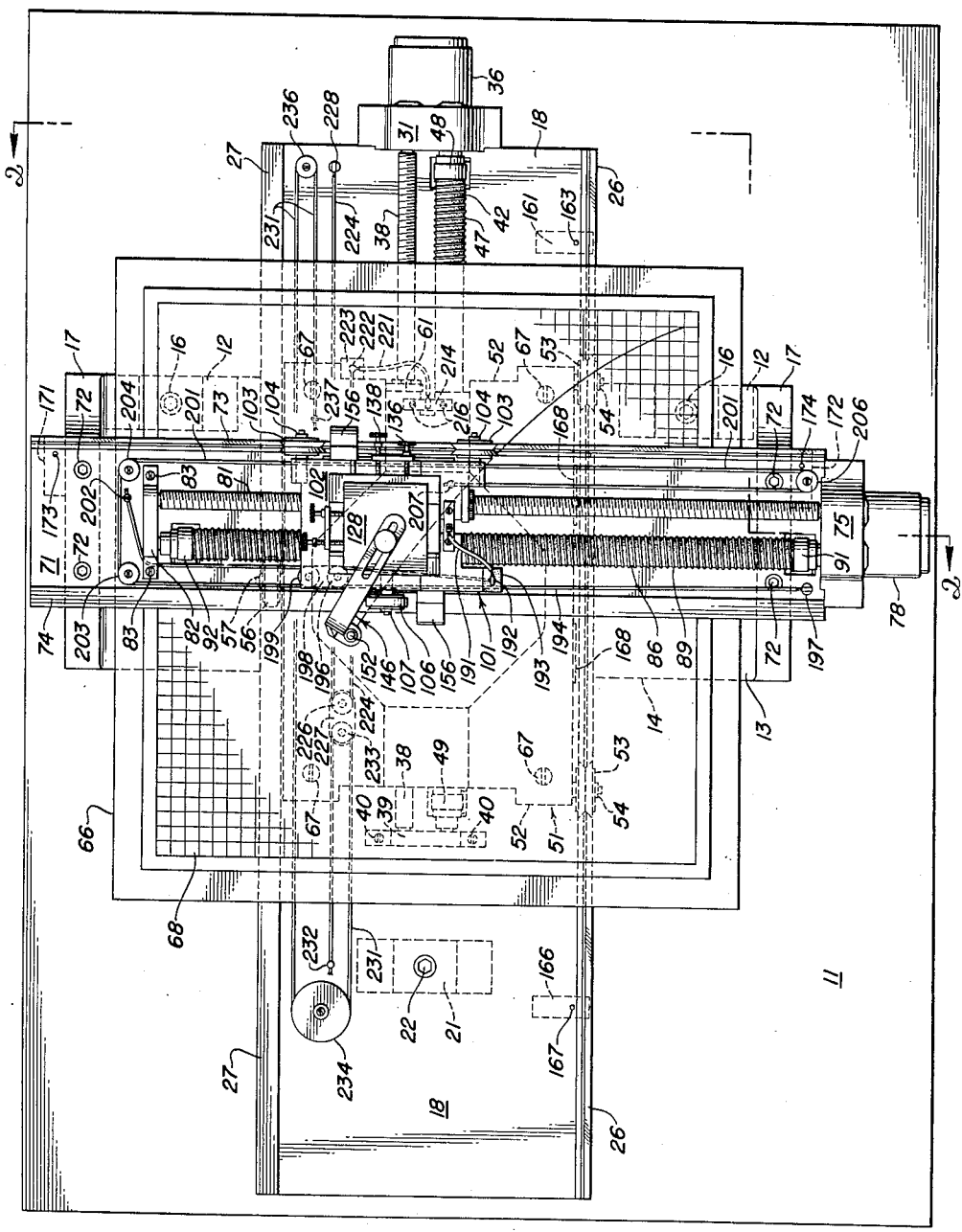
Figure 1 is a plan view of the present invention.
Figure 5:
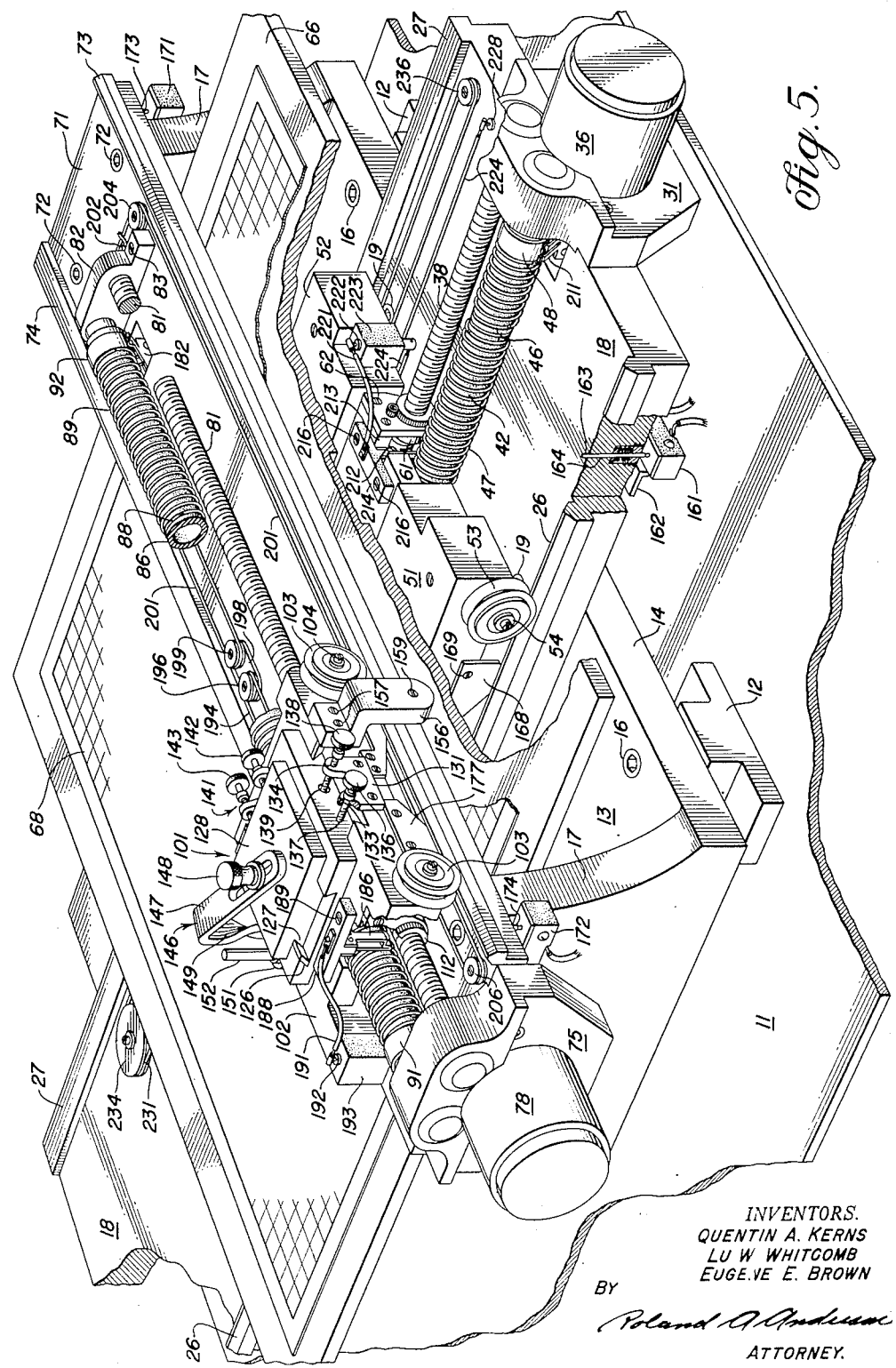
Figure 5 is a perspective view, partly in section, of the invention as illustrated in Fig. 1.

Referring to the drawing in detail, and Figs. 1 and 2 in particular, there is provided a base plate 11 serving as a support for other elements of the invention. Such base plate 11 may be mounted upon a stationary stand or upon a framework provided with wheels for transportability (not shown). A pair of pedestals 12 are disposed in spaced apart relation on the base plate 11 and provide means for mounting a cross rail support 13 above the base plate. Preferably the cross rail support 13 comprises an elongated central portion 14, through which fastening screws 16 are extended to engage the pedestals 12, and transverse leg portions 17 located one at each end of the central portion.

Disposed transversely of the elongated portion 14 of the cross rail support 13 is a rail plate 18 positioned to extend therebeyond by a substantial amount at one end and by a lesser amount at the other end. To maintain the rail plate 18 in such position a plurality of screws 19 may be extended through the plate to suitably engage the cross rail support 13. Another pedestal 21 is disposed on the base plate 11 to support the most extended portion of the rail plate 18 and may be maintained in position by a screw 22 projecting through the rail plate and into the pedestal. It is to be noted that the dimensions of the pedestals 12 and 21 are preferably such that the rail plate 18 is maintained parallel to the base plate 11.

The rail plate 18 is provided with a bevelled rail 26 extending along one of the longitudinal sides thereof and with a flat rail 27 extending along the opposite side. Disposed at one end of the rail plate 18 is a gear box 31 having a driving gear 32 suitably mounted on a shaft 33 therein. A reversible motor 36, having two windings disposed ninety degrees apart, is mounted on the gear box 31 with the rotor coupled to the shaft 33 to provide for rotation of the gear 32. Extended parallel to and between the rails 26 and 27 of the rail plate 18 is a lead screw 38 suitably journalled at one end in a bearing block 39, which is fastened to the rail plate by screws 40, and at the other end in the gear box 31. A gear 41 is provided on the lead screw 38 within the gear box 31 to engage the driving gear 32. Disposed parallel to the lead screw 38 is a tubular insulator 42 having substantially the same length as the lead screw and being journalled at one end in the bearing block 39 and at the other end in the gear box 31. A gear 43, having the same dimensions and number of teeth as the other gear 41, is mounted on the insulator 42 within the gear box 31 and in engagement with the driving gear 32. A helical groove 46, having the same pitch as the threads on the lead screw 38, is provided in the outer surface of the tubular insulator 42 to receive a length of resistance wire 47 extending helically from a ring terminal 48 at one end of the insulator to a second ring terminal 49 at the other end.

A cross carriage 51 is provided to travel along the rail plate 18 and comprises a flat body member 52 having a pair of grooved wheels 53 spaced apart and rotatably mounted on suitable axles 54 projecting from one side of the body member and a conventional wheel 56 similarly mounted on an axle 57 disposed centrally on the opposite side. The transverse dimension of the carriage 51 is selected so that the grooved wheels 53 ride along the bevelled rail 26 and the conventional wheel 56 rides along the flat rail 27 of the rail plate 18. To translate the rotation of the motor 36 and of the lead screw 38 into longitudinal travel of the cross carriage 51 a traveler nut 61, having internal threads matching the threads of the lead screw, is threadably disposed upon the lead screw and rigidly affixed in a suitable manner, as by screws 62, to the body member 52. The traveler nut 61 will be discussed in greater detail hereinafter. Mounted upon the carriage 51 parallel to the rail plate 18 is a table 66, having a transverse dimension which allows passage between the leg portions 17 of the cross rail support 13. The table 66 may be secured to the carriage 51 in a convenient manner, as by screws 67, and adapted to carry a sheet of graph paper 68 on the upper surface thereof.

Disposed parallel to elongated portion 14 of the cross rail support 13 is a transverse track plate 71 fastened, as by screws 72, on the upper face of each of the legs 17 with a slight overhang at each end. The transverse track plate 71 is provided with a bevelled rail 73 extending along one of the longitudinal sides thereof and with a flat rail 74 extending along the opposite side. At one of the overhanging ends of the transverse track plate 71 is disposed a gear box 75, similar to the gear box 31, having a driving gear 76 suitably mounted on a shaft 77 therein. A second reversible motor 78, having two windings disposed ninety degrees apart, is mounted on the gear box 75 with the rotor thereof coupled to the shaft 77 to provide for rotation of the gear 76. Extended parallel to and between the rails 73 and 74 of the transverse track plate 71 is a lead screw 81 suitably journalled at one end in a bearing block 82, which is fastened to the track plate by screws 83, and at the other end in the gear box 75. A gear (not shown) similar to gear 41, is provided on the lead screw 81 within the gear box 75 to engage the driving gear 76. Disposed parallel to the lead screw 81 is a tubular insulator 86 having substantially the same length as the lead screw and being journalled at one end in the bearing block 82 and at the other end in the gear box 75. A second gear 87, having the same dimensions and number of teeth as the other gear, is mounted on the insulator 86 within the gear box 75 and in engagement with the driving gear 76. It will thus be seen that the gearing provided in the gear box 75 is identical with that described for the gear box 31 and illustrated in detail in Fig. 2. A helical groove 88, having the same pitch as the threads on the lead screw 81, is provided in the outer surface of the tubular insulator 86 to receive a length of resistance wire 89 extending helically from a ring terminal 91 at one end of the insulator to a second ring terminal 92 at the other end.

A car 101 is provided to travel along the transverse track plate 71 and comprises a bed 102 having a pair of grooved wheels 103 spaced apart and rotatably mounted on suitable axles 104 projecting from one side of the bed and a conventional wheel 106 similarly mounted on an axle 107 disposed centrally on the opposite side. The transverse dimension of the car 101 is selected so that the grooved wheels 103 travel along the bevelled rail 73 and the conventional wheel 106 travels along the flat rail 74. To translate the rotation of the motor 78 and of the lead screw 81 into longitudinal travel of the car 101, a traveler nut 108, having internal threads matching the threads of the lead screw, is threadably disposed upon the lead screw and rigidly affixed in a suitable manner, as by screws 109, to the bed 102 as illustrated in Figs. 3 and 4. The traveler nut 108 is provided with a recessed portion 111 bearing threads having a finer pitch than those engaging the lead screw 81. An adjusting nut 112, having internal threads matching the threads of the lead screw 81, has an externally threaded portion 113 engaging the threads of the recessed portion 111 of the traveler nut 108 and a knurled collar 114. The knurled portion of a lock bushing 116, mounted on the traveler nut 108 by a screw 117, bears against the knurled collar 114 to lock the adjusting nut 112 in place. With such a system in use the play between the traveler nut 108 and the lead screw 81 is minimized. It will be readily apparent that similar structure may be utilized in conjunction with the traveler nut 61 to minimize play between such nut and the lead screw 38.

The bed 102 of the car 101 is provided with a transverse slot 121 having bevelled edges to receive in interlocking relation a matching portion 122 of a cross slide 123. A similarly bevelled slot 126 is cut longitudinally into the upper surface of the cross slide 123 to receive in interlocking relation a matching portion 127 of a longitudinal slide 128. To adjust the position of the cross slide 123 with respect to the bed 102 a bracket 131 is secured to one of the longitudinal sides of the bed, as by screws 132. The bracket 131 extends above the surface of the bed 102 and such extension is provided with an aperture 133 and a threaded opening 134. A first adjustment screw 136 having a shoulder abutting the plate 31 extends through the aperture 133 and into a threaded opening 137 in the cross slide 123 thus providing a means for pulling the cross slide with respect to the bed 102. A second adjustment screw 138 threadably engages the threaded opening 134 and extends into a shallow bore 139 in the cross slide 123 thus providing a means for pushing the cross slide through the slot 121. A similar adjustment 141 is provided on one side of the cross slide 123 for moving the longitudinal slide 128 with respect to cross slide whereby a screw 142 pulls and a screw 143 pushes the longitudinal slide in the slot 126. A stylus bracket 146, having a slotted portion 147, is mounted substantially transversely on the upper surface of the longitudinal slide 128 of the car 101 by means of a screw 148 extending through the slot into the slide. The stylus bracket 146 is also provided with a helical portion 149, which extends downward toward the table 66, and with a terminal portion 151 parallel to the slotted portion 147. Such terminal portion 151 of the bracket 146 is provided with an aperture to receive a stylus holder 152 which carries a stylus 153 in contact with the graph paper 68. With the foregoing structure assembled it will be readily apparent that the position of the stylus 153 on the graph paper 68 may be adjusted in any desired manner by proper manipulation of either the bracket 146 or the two sets of screws 136, 138 and 142, 143.

To prevent the car 101 from jumping the rails 73 and 74 a hold-down bracket 156 is mounted at one end, as by screws 157, on each longitudinal side of the bed 102 so that a portion of the bracket extends below the level of the rails and transverse thereto. A pin 158 is mounted transversely of the bracket 156, as by a screw 159, in such a manner that the pin extends under the respective rail 73 and 74 in proximity therewith. Thus when the pins 158 are in place the car 101 is locked on the rails 73 and 74 while still movable therealong.

A limit switch 161 is provided at one end of the rail plate 18 and is suitably mounted on the lower surface thereof as by a bracket 162. A spring mounted pin 163 is extended from the actuating mechanism of the switch 161 through an aperture 164 in the rail plate 18. A similar switch 166 and pin 167 is disposed at the other end of the rail plate 18. At either end of the cross carriage 51 a plate 168 is mounted as by screws 169, to extend downward toward the rail plate 18 in alignment with the pins 163 and 167. Thus as the cross carriage 51 travels to one end of the rail plate the plate 168 contacts and depresses the respective pin 163 or 167 to open the respective switch 161 or 166. The electrical connections of the switches 161 and 166 will be described hereinafter.

A similar arrangement is provided on the transverse track plate 71 whereby switches 171 and 172 are suitably mounted on the upright legs 17 under the plate and spring mounted pins 173 and 174 are respectively extended from the actuating mechanisms of the switches through the plate. Mounted, as by screws 176, on the car 101 are plates 177 in alignment with the pins 173 and 174 and extended downward so as to contact the pins. Thus as the car 101 travels to the ends of the rails 73 and 74 the respective pin 173 and 174 is depressed to open the respective switch. The electrical connections of the switches 171 and 172 will be described hereinafter.

Provision is made to impress a voltage across the resistance wire 89 which is electrically connected at each end of the tubular insulator 86 to the ring terminals 91 and 92, respectively, by extending a contact 181 through the transverse track plate 71 to slideably engage the ring terminal 91 and a contact 182 through the track plate at the other end thereof to slideably engage the ring terminal 92. The contacts 181 and 182 are each mounted on the transverse track plate 71 by means of insulator blocks 183 and 184, respectively, and the connecting wires are connected to the contacts at such insulators. The car 101 carries another contact 186 which is extended through a slot 187 in the bed 102 to contact the wire 89 at a position between the lead screw 81 and the tubular insulator 86 upon which the wire is disposed. The latter contact 186 is suitably fastened to an insulator block 188 spanning the slot 187 and held in place by screws 189. It will be readily apparent from the foregoing that, as the lead screw 81 and the tubular insulator 86 rotate, the car 101 will travel along the tracks 73 and 74 with the contact 186 mounted thereon engaging the wire 89 at all times. Thus, in effect, there is provided a potentiometer having a sliding contact 186.

To utilize the sliding contact 186 it is necessary to provide an electrical connection between the contact and the utilizing circuit, the latter of which will be discussed fully hereinafter. In accomplishing the foregoing an electrical conductor 191 is connected at one end to the contact 186 and at the other end to a terminal 192 imbedded in an insulating block 193 which is suitably mounted on one end of the bed 102 so that a portion of the terminal extends below the bed between the rail 74 and the tubular insulator 86. An electrical conductor 194 is suitably fastened at one end to the lowermost portion of the terminal 192 with the other end trained around a pulley 196 and brought back to the end of the transverse track plate 71 where it is secured to a stationary terminal 197. The pulley 196 is mounted on a sliding plate 198 which rests on the surface of the transverse track plate 71 and which bears a second pulley 199 rotatably mounted thereon. To maintain tension of and prevent slack in the conductor 194 a wire 201 is suitably anchored at one end to a point 202 on the transverse track plate 71 opposite the end bearing the terminal 197. The other end of the wire 201 is extended to train about the second pulley 199 on the sliding plate 198; thence about a pulley 203 mounted adjacent to, but clearing, one end of the bearing block 82; thence across the transverse track plate 71 and about a pulley 204 mounted adjacent the other end of the bearing block; thence parallel to the track 73 to the other end and about a pulley 206 mounted thereat; and thence to an anchor post 207 mounted beneath the bed 102 of the car 101. Thus as the car 101 travels from one end of the transverse rail plate 71 to the other the system of wire 201 and pulleys 199, 203, 204, and 206 allows the plate 198 to slide accordingly and maintains an equal tension in the conductor 194.

A voltage may be impressed across the resistance wire 47, in a manner similar to that outlined above for the wire 89; that is, by contacts 211 (only one of which is illustrated) extended through apertures in the rail plate 18 to ride against the ring terminals 48 and 49, respectively. The cross carriage 51, like the car 101, is provided with a contact 212 extended through a slot 213 through the body member 52 to contact the wire 47 between the tubular insulator 42 and the lead screw 38. The contact 212 is suitably fastened to an insulator block 214 spanning the slot 213 as by screws 216. Thus there is provided a second potentiometer having a sliding contact 212 which is similar to the aforementioned potentiometer having a sliding contact 186 and disposed at right angles thereto.

A conductor 221 is connected to the sliding contact 212 at the insulator block and is further connected to a terminal 222 which is imbedded in an insulating material 223 and suitably mounted on one end of the cross carriage 51. The lower end of the terminal 222 extends down beneath the cross carriage 51 and provides a suitable connecting point for an electrical conductor 224. From the connection at the terminal 222 the conductor 224 is extended under the cross carriage 51 to train about a pulley 226 mounted upon a sliding plate 227 and from there back to a stationary binding post or terminal 228 mounted on the rail plate 18 at a position substantially equivalent to the point of furtherest travel of the cross carriage. A wire 231 is anchored at a point 232 on the rail plate 18 at the other end of travel of the cross carriage 51 and such wire is extended to train about a second pulley 233 mounted on the sliding plate 227, thence back to train about another pulley 234 located beyond the point 232 of anchorage, thence forward beneath the cross carriage parallel to the rail 27 to train about another pulley 236 mounted on the rail plate adjacent the terminal 228, and thence back to an anchor post 237 mounted beneath the cross carriage 51. Thus as the cross carriage 51 travels from one end of the rail plate 18 to the other the system of wire 231 and pulleys 233, 234, and 236 allows the plate 227 to slide accordingly and maintains an equal tension in the conductor 224.

The foregoing completes the structural description of the apparatus and it is seen that there is provided a table 66 adapted to carry graph paper 68 which may be moved forward or backward along the longitudinally disposed rail plate 18 and a car 101, bearing a stylus 153 which rests upon the graph paper, movable transversely to the movement of the table. For controlling the movements of the table 66 and stylus 153 a pair of motors 36 and 78 are, respectively, provided. Each of the motors 36 and 78 is energized by suitable circuits, as illustrated in Fig. 6.

A conventional two-prong plug 251 is provided to connect to a commercial source of sixty cycle alternating voltage. One end of a suitable two-conductor cable is connected to the prongs of the plug 251 and the other end thereof is connected to the terminals 253 and 254, respectively, on one side of a double-pole double-throw reversing switch 256. One of such terminals 253 is connected to one side of an actuating coil 257 of a relay 258, the other side of which is connected to the limit switch 161. The limit switch 166 is connected in series with the limit switch 161 and is further connected to the other terminal 254 of the switch 256. Thus it is necessary for the limit switches 161 and 166 to be in the normally closed position before the relay 258 is actuated. The switch 256 has two center terminals 261 and 262 connected to the knife blades thereof with the terminal 261 connected to a normally open contactor 263 of the relay 258, which in turn is connected to one of the windings of the motor 36, and the terminal 262 connected to the same winding of the motor 36 through a capacitor 264. The purpose of the capacitor 264 in the circuit will be set forth hereinafter.

The cable connected to the plug 251 is also connected to a converter 266 of the vibrator type, as shown in Fig. 7. A coil 267 within the converter 266 having an iron core is connected across the alternating voltage to cause a vibrator element 268 to oscillate at the frequency thereof. Such vibrator element 268 is connected to source of voltage which varies in accordance with a first variable characteristic of a device 269 to be analyzed. A pair of contacts 271 and 272 disposed one on each side of the vibrating element 268, so that an alternate "make and break" condition exists at each, are brought out to two terminals 273 and 274, respectively. Connected to the terminals 273 and 274 are the end leads of a center-tapped primary winding 276 of a transformer 277. The center tap of such winding 276 is directly connected by means of the conductor 224 to the sliding contact 212 mounted on the body member 52 of the cross carriage 51 to contact the resistance wire 47. Connected across the resistance wire 47 is a constant current source 281 to develop a constant standard voltage thereacross having a polarity such that it opposes the voltage derived from the device 269. Under such circumstance it will be readily apparent that a sixty cycle voltage, having a magnitude substantially proportional to the difference between that picked off the wire 47 by the sliding contact 212 and that applied to the converter 266 from the device 269, is induced in the secondary winding 283 of the transformer 277.

A conventional amplifier 286 is connected with its input tied to the leads of the secondary winding 283 and with its output connected to furnish a push-pull voltage to the other winding of the motor 36. The motor 36 has two windings, as has been stated hereinbefore, and is phase sensitive to the extent that the motor will not run unless the two input voltages have a ninety degree phase difference. Then, if such phase difference is a ninety degree lead, the rotor of the motor 36 will turn in one direction and, if the phase difference is a ninety degree lag, the rotor will turn in the opposite direction. It is apparent that one winding of the motor 36 and the coil 267 of the converter 266 are energized from the same source and therefore are in phase. It has been found in practice that a substantial delay is introduced by the action of the vibrator element 268, but that it is still necessary to connect the capacitor 264 into the circuit of the above-mentioned winding of the motor 36 to advance the phase of the voltage from the source to obtain the desired ninety degree phase relationship. Thus when the difference in voltage from the sliding contact 212 and the device 269 is in one direction the rotor of the motor 36 rotates until such voltages balance to stop the motor. A similar action results when the voltage difference is in the opposite direction to rotate the rotor of the motor 36 oppositely until the voltages balance and stop the motor, because the ninety degree phase relation exists in the opposite sense.

A similar set of connections and circuit elements are provided to energize the motor 78 mounted on the transverse track plate 71 to move the car 101 in accordance with a voltage proportional to a second variable characteristic of the device 269. A double-pole double-throw switch 291 is suitably connected with the terminals at one end thereof to the cable leading from the plug 251. The voltage of the plug 251 is also connected serially through the two normally closed limit switches 171 and 172 across a coil 292 of a relay 293. One of the central terminals of the switch 291 is connected to one side of a contactor 294 of the relay 293, the other side of which is connected to one winding of the motor 78, and the other central terminal of the switch is connected through a phase shifting capacitor 296 to the same winding of the motor. A converter 298, similar to the converter 266, is connected with the actuating coil to the source of alternating voltage at the plug 251, with the vibrating element to the device 269, and with the contacts to the leads of a center-tapped primary winding 301 of a transformer 302. The center tap of the transformer winding 301 is connected to the sliding contact 186 on the car 101 by means of the conductor 194. A second conventional constant current source 304 is connected across the resistance wire 89 by means of the ring terminals 91 and 92 to impress a constant voltage thereacross. The voltage induced at the secondary winding 303 of the transformer 302 is connected to the input of an amplifier 306 which furnishes a push-pull output voltage to the other winding of the motor 78. The operation of such portion of the present invention is similar in all respects to that outlined for the motor 36, thus the motor 78 operates to drive the car 101 back and forth along the transverse track plate 71 in accordance with voltage proportional to the second variable characteristic of the device 269.

The present invention has been found useful in determining the relation in an electromagnetic accelerator between the increasing magnetic field and the frequency of the frequency modulated accelerating radio frequency voltage. Since the current flowing through the coils establishing the magnetic field is proportional to the field strength, a series resistor may be used to develop a voltage proportional to the field strength and a portion of such voltage, limited to a maximum of substantially one volt, is connected to the vibrating element 268 of the converter 266. A conventional discriminator circuit may be utilized to develop a voltage proportional to the frequency of the frequency modulated radio frequency accelerating voltage and, limited to a maximum change of substantially one volt, such developed voltage is applied to the vibrating element of the converter 298.

With such connections made and with the cross carriage 51 positioned at the end of the rail plate 18 adjacent the motor 36 and the car 101 positioned at the end of the transverse track plate 71 adjacent the motor 78, the apparatus is set to trace the desired characteristic relationship between the two variables. It is to be noted that the sliding contact 212 is adjacent the ring terminal 48 so that the voltage between the sliding contact and ground is at a minimum. Thus as the voltage, proportional to the magnetic field strength, increases, the difference between such voltage and that of the sliding contact 212 is impressed on one winding of the motor 36 by the converter 266 through the amplifier 286 as an alternating square wave of voltage which lags the alternating voltage on the other winding thereof by ninety degrees. Such combination of voltages impressed on the windings of the motor 36 results in rotation of the rotor thereof which, through the gear box 31, rotates the lead screw 38 and the tubular insulator 42. The rotation of the lead screw 38 is in such direction that the cross carriage 51 advances the sliding contact 212 until the voltage "picked off" the wire 47 is equal to the voltage against which it is balanced, at which time the motor ceases to rotate. If, then, the voltage, proportional to the magnetic field strength, becomes less than the voltage of the sliding contact 212, the alternating square wave of voltage applied by the amplifier 286 to the motor 36 leads the voltage applied to the motor from the plug 251. Thus the motor 36 revolves the lead screw 38 in the opposite direction thereby moving the cross carriage 51 back until the voltages again balance at the transformer 277 to stop the motor.

Since a similar set of connections and elements are provided with respect to the car 101 and the motor 78, variations in the frequency of the frequency modulated accelerating radio frequency voltage result in comparable travel of the car on the transverse track plate 71. Considering that movements of the car 101 and cross carriage 51 occur simultaneously in response to the respective characteristic, it is readily apparent that the stylus 153 and table 66 respectively move in accordance with the variation in the frequency of the frequency modulated accelerating radio frequency voltage and the magnetic field strength to trace the relationship therebetween on graph paper 68.

The use of the apparatus described above is merely illustrative and not to be considered as limiting in any sense. It will be apparent that the relationship of one characteristic of a system may be plotted against the same characteristic of a second system or against a different characteristic of a second system. Thus the use of the apparatus of the present invention is varied and an analyzer having great functionality is provided.

While the salient features of the present invention have been described in detail with respect to one embodiment it will, of course, be apparent that numerous modifications may be made within the spirit and scope of the invention and it is not therefore desired to limit the invention to the exact details shown except insofar as they may be defined in the following claims.

What is claimed is:

1. In an analyzing apparatus, the combination comprising a first assembly including a rail plate having rails extending along two parallel sides, a tubular insulator rotatably mounted on said rail plate and extended for substantially the length of and parallel to said rails, a length of resistance wire helically wound on said insulator, a source of constant current connected across said wire, a lead screw rotatably mounted on said rail plate parallel to said insulator, the threads on said lead screw having the same pitch as said helical wire, a carriage disposed on said rails having a traveler nut engaging said lead screw and a contact bearing against said helical wire, circuit means connected to said contact for comparing the voltage thereat against a voltage proportional to a first variable, a phase sensitive motor mounted at one end of said rail plate and having the rotor thereof geared to said insulator and said lead screw, means coupling said comparing means to a winding of said motor for energization thereof in response to said first variable; a second substantially identical assembly disposed transversely to said first assembly and in a plane parallel to and spaced from the plane of said first assembly so that the carriage thereof is similarly moved in response to a second variable; a table mounted on the carriage of said first assembly; and a stylus mounted on the carriage of said second assembly and extended to scribe a single plot on said table of the relation between said variables.

2. In an analyzing apparatus, the combination comprising a first assembly including a rail plate having rails extending along two opposing sides, a tubular insulator rotatably mounted on said rail plate and extended for substantially the length of and parallel to said rails, a length of resistance wire helically wound on said insulator, a source of constant current connected across said wire, a lead screw rotatably mounted on said rail plate parallel to said insulator, the threads on said lead screw having the same pitch as said helical wire, a carriage disposed on said rails having a traveler nut engaging said lead screw and a contact bearing against said helical wire, circuit means connected to said contact for comparing the voltage thereat against a voltage proportional to a first variable, a two-phase motor mounted at one end of said rail plate and having a rotor thereof geared to said insulator and said lead screw, a source of alternating voltage connected to one winding of said motor, a converter connected to said source of alternating voltage for changing the difference between said voltages into an alternating square wave of voltage, means for connecting said square wave of voltage to the second winding of said motor, means included in the winding connections of said motor for introducing a ninety degree phase difference between the voltages thereof; a second substantially identical assembly disposed transversely to said first assembly and in a plane parallel to and spaced apart from the plane of said first assembly so that the carriage thereof is moved in response to a second variable; a table mounted on the carriage of said first assembly; and a stylus mounted on the carriage of said second assembly and extended to scribe a single plot on said table of the relation between said variables.

QUENTIN A. KERNS.
LU W. WHITCOMB.
EUGENE E. BROWN.

REFERENCES CITED

The following references are of record in the file of this patent:

UNITED STATES PATENTS

| Number | Name | Date |
| --- | --- | --- |
| 2,033,177 | Borden | Mar. 10, 1936 |
| 2,150,502 | Harrison et al. | Mar. 14, 1939 |
| 2,229,069 | Geyger | Jan. 21, 1941 |
| 2,366,383 | Cameron | Jan. 2, 1945 |
| 2,464,708 | Moseley | Mar. 15, 1949 |